(12) United States Patent
Nett et al.

(10) Patent No.: US 7,387,315 B2
(45) Date of Patent: Jun. 17, 2008

(54) BELT GUIDING ELEMENT FOR CHILD SAFETY SYSTEM

(75) Inventors: Reiner Nett, Aschaffenburg (DE); Ruediger Boll, Bessenbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/730,706

(22) Filed: Apr. 3, 2007

(65) Prior Publication Data
US 2007/0188001 A1 Aug. 16, 2007

Related U.S. Application Data

(63) Continuation of application No. PCT/DE2005/001692, filed on Sep. 21, 2005.

(30) Foreign Application Priority Data
Oct. 5, 2004 (DE) .............. 10 2004 048 997

(51) Int. Cl.
B44B 21/00 (2006.01)

(52) U.S. Cl. .................. 280/801.1; 297/250.1; 24/598.2

(58) Field of Classification Search ......... 280/801.1, 280/808; 297/468, 483, 486, 482, 250.1; 24/163 R, 598.2; B60R 22/26, 22/10
See application file for complete search history.

(56) References Cited

U.S. PATENT DOCUMENTS

| | | | | |
|---|---|---|---|---|
| 3,510,151 A | * | 5/1970 | Weman | 280/808 |
| 3,844,001 A | * | 10/1974 | Holmberg | 24/598.1 |
| 5,085,449 A | * | 2/1992 | Hudson | 280/801.1 |
| 5,609,367 A | | 3/1997 | Eusebi et al. | |
| 6,474,691 B2 | * | 11/2002 | Izume et al. | 280/801.1 |
| 6,749,223 B2 | * | 6/2004 | Kazuo et al. | 280/801.1 |
| 2002/0011726 A1 | | 1/2002 | Izume et al. | |
| 2004/0245826 A1 | | 12/2004 | Santamaria | |

FOREIGN PATENT DOCUMENTS

| | | |
|---|---|---|
| AU | 2004100332 A4 | 5/2004 |
| DE | 42 04 232 A1 | 9/1992 |
| DE | 299 23 426 U1 | 11/2000 |
| FR | 2 738 541 | 3/1997 |

* cited by examiner

Primary Examiner—Ruth Ilan
Assistant Examiner—Drew J. Brown
(74) Attorney, Agent, or Firm—Foley & Lardner LLP

(57) ABSTRACT

A belt guiding element for a child safety system, in particular for a child seat, can provide a high safety level and particularly highly comfortable use when the safety belt is inserted into the element and when the belt is removed therefrom. The belt guiding element comprises a slot for receiving a safety belt, on the vehicle side, in particular a three-point belt, and a locking element capable of being open or closed. The locking element enables, in an open position, for the safety belt to be inserted into the slot or the safety belt previously inserted into the slot, to be removed. In a closed position the locking element enables, the insertion or removal of the safety belt to be prevented. The locking element includes a lock lever which can pivot about a pin spaced apart from the slot.

24 Claims, 3 Drawing Sheets

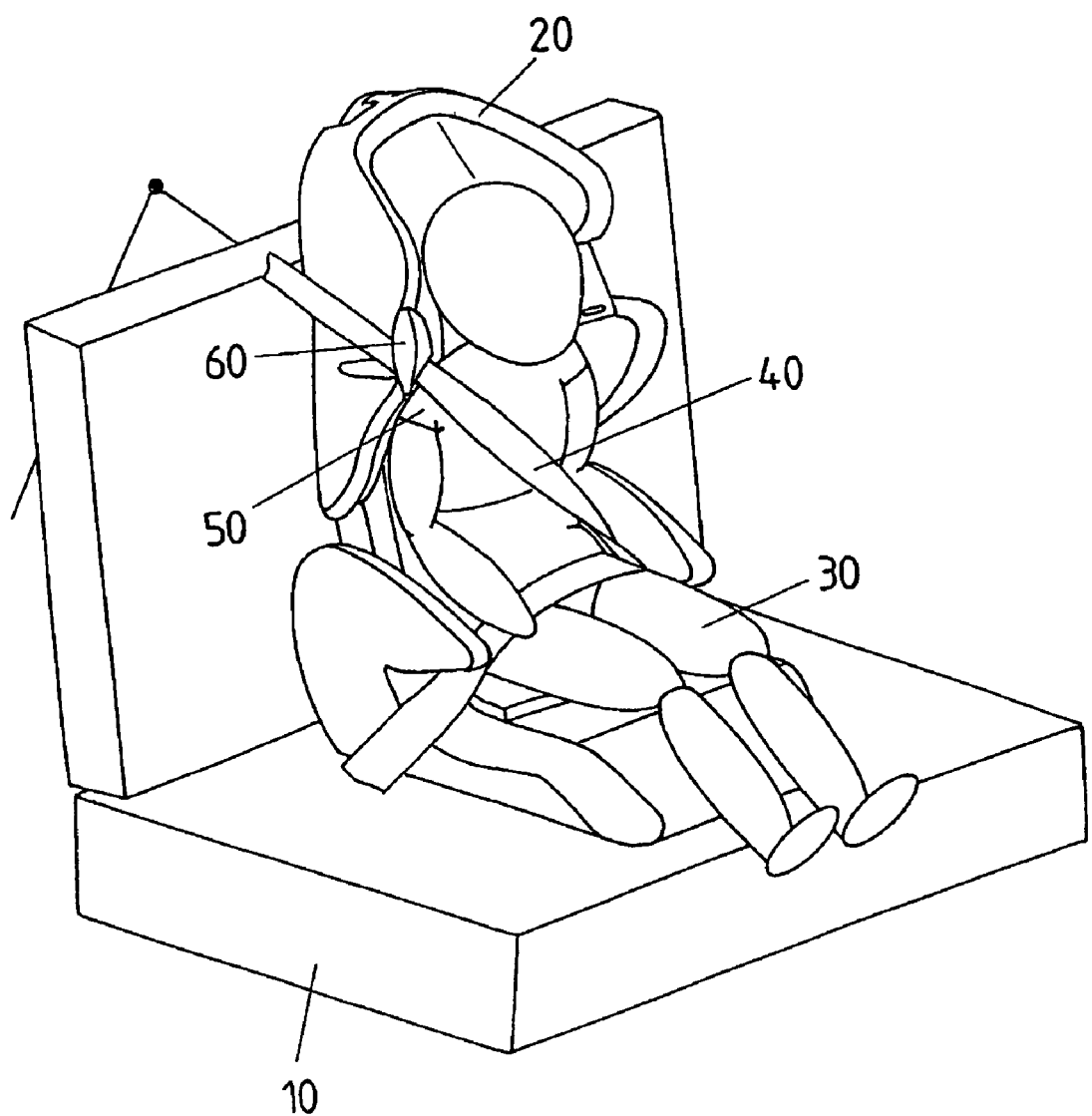

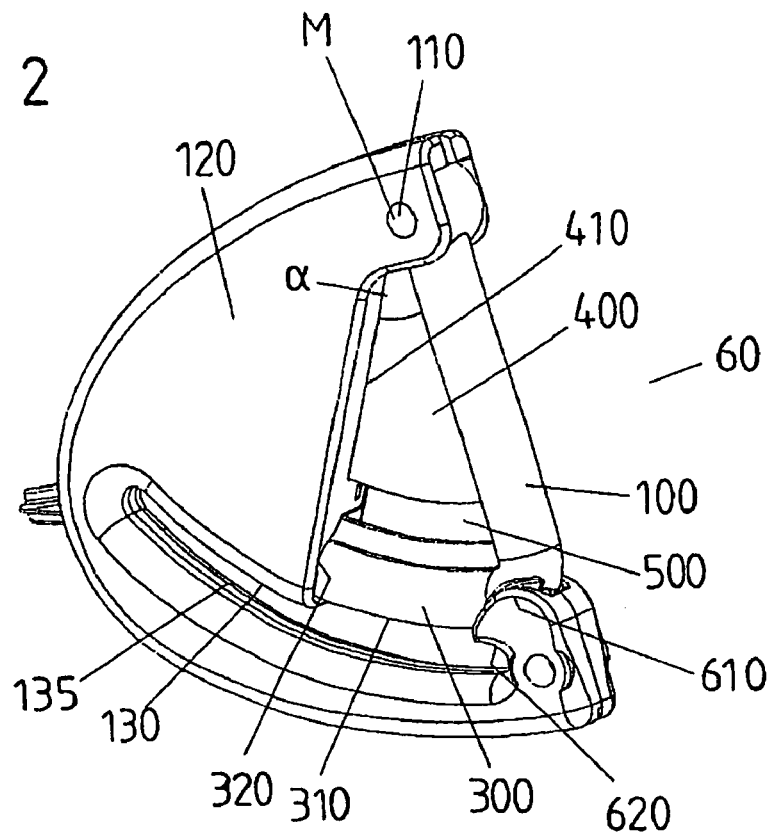
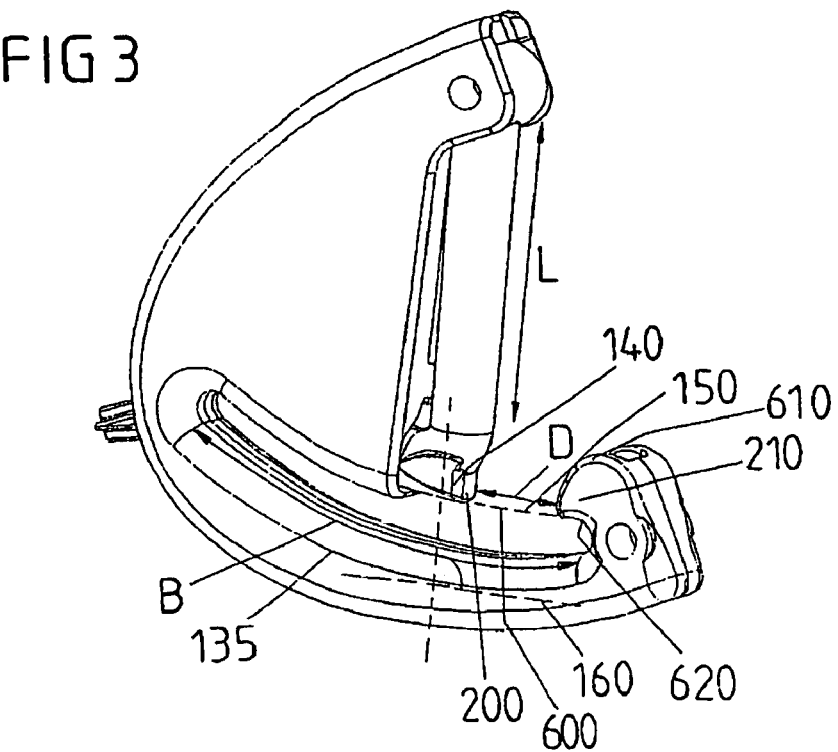

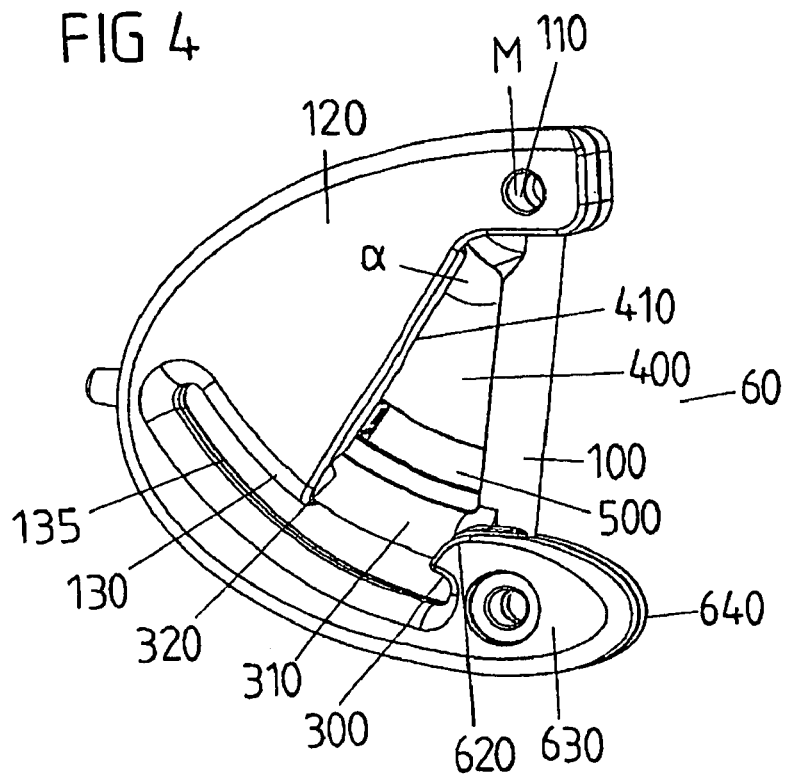
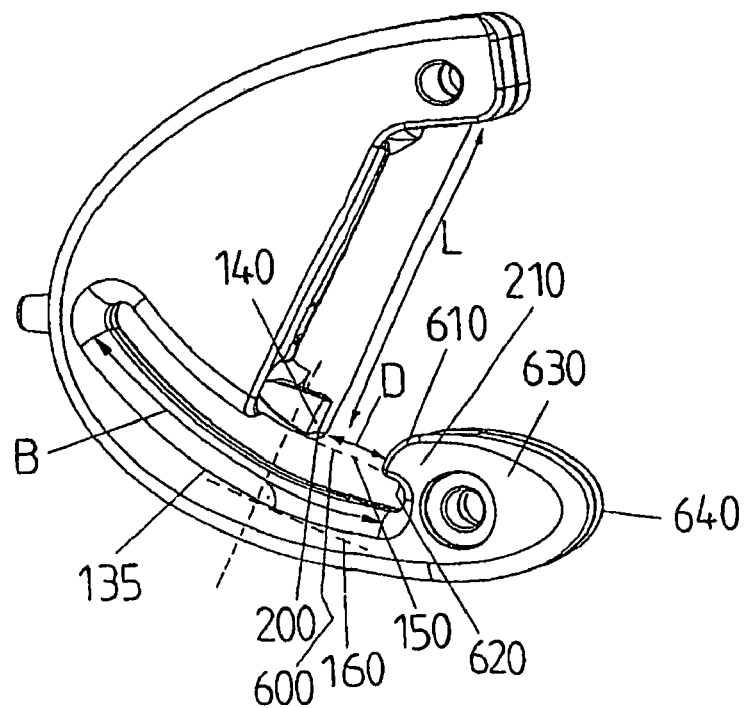

BELT GUIDING ELEMENT FOR CHILD SAFETY SYSTEM

CROSS-REFERENCE TO RELATED PATENT APPLICATIONS

This application is a continuation of International Application PCT/DE 2005/001692, which has an international filing date of Sep. 21, 2005; this International Application was not published in English, but was published in German as WO 2006/037289, both of which are incorporated herein by reference in their entirety.

BACKGROUND

The invention relates to a belt-guiding element for a child-safety system, or for a child seat, by which a child can be secured in a vehicle by a safety belt, for example a 3-point safety belt, of the vehicle. A child-safety system is known to be equipped with at least one belt-guiding element by which the safety belt is optimally positioned in the shoulder region of the child who is to be secured. In order to be able to accommodate the safety belt, such a belt-guiding element has to have an access opening through which the safety belt is introduced or "threaded in." From a safety point of view, such an access opening should be as small as possible, in order to prevent any instances of the safety belt sliding out of the belt-guiding element. From a handling point of view, however, the access opening should be as large as possible, in order to allow the safety belt to be straightforwardly introduced and removed.

SUMMARY

One exemplary embodiment of the relates to a belt-guiding element for a child-safety system. The belt-guiding element comprises an accommodating slot for accommodating a vehicle-mounted safety belt and a locking element with an open position and a closed position. The locking element comprising a pivotable locking lever which can be pivoted about a pivot pin spaced apart from the accommodating slot. The safety belt can be inserted into the accommodating slot or an inserted safety belt can be removed from the accommodating slot when the locking element is in the open position. The safety belt is prevented from being inserted or removed when the locking element is in the closed position. At least a portion of the accommodating slot runs in the form of a circular path, and the pivot pin of the locking lever forms a center point of the circular path of the accommodating slot.

Another embodiment relates to a child seat. The child seat comprises a belt-guiding element. The belt guiding element includes an accommodating slot for accommodating a vehicle-mounted safety belt and a locking element with an open position and a closed position. The locking element comprises a pivotable locking lever which can be pivoted about a pivot pin spaced apart from the accommodating slot. The safety belt can be inserted into the accommodating slot or an inserted safety belt can be removed from the accommodating slot when the locking element is in the open position. The safety belt is prevented from being inserted or removed when the locking element is in the closed position. At least a portion of the accommodating slot runs in the form of a circular path, and the pivot pin of the locking lever forms a center point of the circular path of the accommodating slot.

These and other features, aspects, and advantages of the present invention will become apparent from the following description, appended claims, and the accompanying exemplary embodiments shown in the drawings, which are briefly described below.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows an exemplary embodiment of a child seat of a child-safety system having a belt-guiding element.

FIG. 2 shows the belt-guiding element according to FIG. 1 in the closed position.

FIG. 3 shows the belt-guiding element according to FIGS. 1 and 2 in the open position.

FIG. 4 shows a second exemplary embodiment of a belt-guiding element.

FIG. 5 illustrates the second exemplary embodiment of a belt-guiding element of FIG. 4.

DETAILED DESCRIPTION

An object is to specify a belt-guiding element for a child-safety system, in particular for a child seat, which allows a high level of safety and, at the same time, is particularly easy to use for introducing and removing the safety belt; that is to say for fastening the safety belt over the child who is to be secured.

Embodiments thus provide a belt-guiding element for a child-safety system, in particular for a child seat, in the case of which a locking element of the belt-guiding element, in its open position, makes it possible for the safety belt to be inserted into an accommodating slot of the belt-guiding element or for a previously inserted safety belt to be removed from the accommodating slot and, in its closed end position, prevents the safety belt from being inserted or removed. According to the invention, this locking element is formed by a pivotable locking lever which can be pivoted about a pivot pin which is spaced apart from the accommodating slot.

One possible advantage of the belt-guiding element can be seen in that the belt-guiding element ensures a particularly high level of safety for the child who is to be secured; this is because the pivotable locking lever has a closed end position in which the fastened safety belt is reliably prevented from sliding out in an undesirable manner.

According to an embodiment, a further essential advantage of the belt-guiding element is that it is very easy to use, since it is readily possible for the safety belt to be straightforwardly introduced into the accommodating slot, and removed therefrom, because the locking lever provides an open position which ensures easy access to the accommodating slot.

A particularly large access opening for the introduction and removal of the safety belt is achieved, according to an advantageous configuration of the belt-guiding element, when the accommodating slot, at least in certain sections, runs in the form of a circle—that is to say over an "imaginary" circular path—and when the pivot pin of the locking lever forms the center point of the circular path of the accommodating slot. In this case, the locking lever is preferably arranged such that, during opening or closure of the locking lever, an end of the locking lever which is directed toward the accommodating slot describes a section of a "locking-lever circular path" which runs concentrically in relation to the accommodating slot. As a result of "circular" pivoting of the locking lever "parallel to", or concentrically in relation to, the accommodating slot, the access opening is particularly large and the belt can also be introduced with just one hand, that is to say "single-handedly".

Comparably good accessibility to the accommodating slot can be achieved if, in each pivoting position, the locking lever is located in each case perpendicularly in relation to an imaginary tangent which is formed at that location of the preferably at least more or less circular accommodating slot which is located closest to the end of the locking lever in each case.

In order to ensure that the safety belt has as defined a position as possible in the accommodating slot, there is preferably connected to the end of the locking lever which is directed toward the accommodating slot a positioning member, of which the outer contour corresponds to that section of the circular path over which the locking lever passes as it opens or closes, and which, in the closed end position of the locking lever, restrains, and positions, the safety belt in the accommodating slot.

A housing of the belt-guiding element preferably has an accommodating opening for accommodating the positioning element in its entirety. In the open position of the locking lever, the positioning element is preferably fully inserted into this accommodating opening.

Furthermore, it is considered to be advantageous if a covering element, in particular a covering plate, is arranged on the locking lever so as to prevent parts of the body, for example a finger of the child who is to be secured, or other objects from being inserted into the space between the locking lever and the housing, which retains the pivot pin of the locking lever. Such a covering element thus ensures, on the one hand, that the child who is to be secured does not get anything trapped and, on the other hand, that objects which could block the locking lever and prevent removal of the safety belt cannot be inserted into the pivoting region of the locking lever.

The housing of the belt-guiding element preferably has an accommodating opening—referred to hereinbelow as further accommodating openings—for accommodating the covering element preferably in its entirety; the covering element, in the open position of the locking lever, is inserted into this further accommodating opening.

The positioning member and the covering element may, for example, be integrally connected to the locking lever.

In order to cut back on material and weight, a separating slot, for example, may be provided between the positioning member and the covering element. In this case, the separating slot is preferably dimensioned so as to prevent parts of the body of the child who is to be secured, or other "obvious" objects from being inserted into the separating slot.

In order to ensure that the belt-guiding element is always closed when the vehicle is traveling, it is preferably configured such that it automatically closes completely. Such automatic closure is preferably effected by a spring element which interacts with the locking lever and always subjects the latter to a force in the direction of the closed end position of the locking lever.

In order to allow particularly good accessibility to the accommodating slot, the locking lever is preferably arranged such that, in its open state, it releases at least a fifth of the size of the accommodating slot, preferably a third of, or half, the size of the accommodating slot.

In order to ensure that the locking lever is arrested securely in its closed end position, the end of the locking lever is preferably provided with a latching element which interacts with a latching device on the housing, which retains the pivot bearing of the locking lever. The latching element of the locking lever and the latching device of the housing here are configured to match one another such that the latching device latches the locking lever in the closed end position of the latter and releases the same only when a predetermined deflecting force has been exceeded. The deflecting force may be, for example, such that it cannot usually be applied by the children who are to be secured, so that the locking lever can only be opened by adults. The correspondingly suitable deflecting force can be determined, for example, by series of tests.

According to an embodiment, the belt-guiding element is of the most compact and space-saving form possible, for example, when the housing of the belt-guiding element, as seen in plan view, is at least more or less in the form of a circle segment, of which the segment size corresponds to approximately twice the maximum possible pivoting angle of the locking lever.

The housing preferably has a rounded sliding surface. The pivotable locking lever is preferably pivoted inward for opening purposes, the opening of the accommodating slot being oriented upward.

Moreover, the housing is, in an embodiment, advantageously equipped with a hook region. This hook region is preferably formed such that the safety belt is held in position even in the event of an accident.

Embodiments also relate to a child-safety system, in particular a child seat, which is equipped with a belt-guiding element.

In order, in the case of such a child-safety system, to achieve the highest possible level of safety as regards the positioning of the safety belt and also to allow the safety belt to be introduced and removed particularly easily, the child-safety system has, according to an embodiment, a belt-guiding element as has been described in detail above.

The belt-guiding element may be fastened, for example, directly on the child seat. In order to position the belt-guiding element in the shoulder region of the child who is to be secured, it is preferably arranged at the shoulder height of the child.

In order to allow optimum positioning of the safety belt even in the case of children of different heights, the position of the belt-guiding element on the child seat is preferably adjustable.

FIG. 1 shows a vehicle seat 10, which may be a rear vehicle-seat bench or also a front vehicle seat, that is to say the passenger seat. A child seat 20, which forms a child-safety system, is fastened on the vehicle seat 10. A child 30 is seated on the child seat 20 and is strapped in by a safety belt 40 of the motor vehicle. The safety belt 40 is a three-point safety belt.

As can be seen in FIG. 1, a belt-guiding element 60 is fastened on the child seat 20 in the region of the shoulder 50 of the child 30. The safety belt 40 is guided through the belt-guiding element 60, so that the belt-guiding element 60 positions the safety belt 40 in the region of the shoulder 50 of the child 30.

FIG. 2 illustrates the belt-guiding element 60 according to FIG. 1 in detail. It can be seen in FIG. 2 that the belt-guiding element 60 has a pivotable locking lever 100 which is mounted such that it can be pivoted about a pivot pin 110. The pivot pin 110 or the pivot bearing is retained by a housing 120 of the belt-guiding element 60.

The pivotable locking lever 100 blocks the access to an accommodating slot 130 of the belt-guiding element 60. The accommodating slot 130 runs in the form of a circle and thus forms the section of a circular path 135; the accommodating slot 130 serves for accommodating the safety belt 40 and thus for positioning the safety belt in the shoulder region of the child 30.

Pivoting the locking lever 100 renders the accommodating slot 130 accessible, so that the safety belt 40 can be inserted into the accommodating slot 130 or removed therefrom. The action of pivoting the locking lever 100 away can be seen in FIG. 3, because FIG. 3 shows the locking lever 100 in its open position.

It can also be seen in FIGS. 2 and 3 that, in an embodiment, the pivot pin 110 of the locking lever 100 is arranged such that it forms the center point M of the circular-path section 135 of the accommodating slot 130. During opening or closure of the locking lever, an end 140 of the locking lever 100 which is directed toward the accommodating slot 130 thus describes a section of a circular path 150 which runs concentrically in relation to the accommodating slot 130, which at least in certain sections runs in the form of a circle, and thus concentrically in relation to the circular-path section 135. As a result of this arrangement of the pivot pin, moreover, in each pivoting position, the locking lever 100 is located in each case perpendicularly in relation to an imaginary tangent 160 which can be formed at that location of the circular path 135 of the accommodating slot 130 which is located closest to the end 140 of the locking lever 100 in each case.

The length L of the locking lever 140 is preferably such that the opening distance D between the end 140 of the locking lever 100 in the open position of the latter, relative to its closed position, is at least a fifth, preferably a third to a half, of the overall width B of the accommodating slot 130.

In order to ensure that the locking lever 100 is always located in its closed position if the safety belt 40 is not to be introduced or removed, the locking lever is connected to a spring element (not illustrated in FIGS. 2 and 3) which may be accommodated, for example, in the housing 120. By means of the spring element, the locking lever 100 is always pivoted into the closed position, which is illustrated in FIG. 2.

In order also to ensure that the locking lever 100 remains securely in its closed end position if it is not to be pivoted away intentionally, the end of the locking lever 140 is equipped with a latching element 200 which interacts with a latching device 210 of the housing 120. As soon as the locking lever 100 is moved into the position which is illustrated in FIG. 2, the latching element 200 latches with the latching device 210, so that pivoting of the locking lever 100 is only possible when a predetermined minimum deflecting force is exceeded. The minimum deflecting force may be, for example, such that it cannot usually be readily applied by young children; this ensures that the child who is to be secured cannot readily remove the safety belt 40 on his/her own.

It can also be seen in FIG. 2 that a positioning member 300 is, for example, integrally fitted on the locking lever 100. The positioning member 300 here is fastened on the locking lever 100 such that its outer contour 310 corresponds essentially to the course taken by the accommodating slot 130. This ensures that, once it has been introduced into the accommodating slot 130, the safety belt 40 remains securely in position, and cannot, for example, twist, as soon as the locking lever 100 reaches its closed position, which is shown in FIG. 2.

The housing 120 contains, for the positioning member 300, an accommodating opening 320 which, when the locking lever 100 pivots into the open position, which is illustrated in FIG. 3, accommodates the positioning member 300 in its entirety.

FIG. 2 also shows a covering plate 400, as a covering element, which is likewise, for example, integrally connected to the locking lever 100. In an embodiment, the task of the covering plate is to prevent objects or, for example, fingers of the child who is to be secured from being inserted into the pivoting region of the locking lever 100. The housing 120 has a covering plate 400 and a further accommodating opening 410, which allows the covering plate 400 to be fully inserted when the locking lever 100 is pivoted into the open position.

A separating slot 500, for example, may be arranged between the covering plate 400 and the positioning member 300, although such a separating slot 500 is not absolutely necessary.

As can be seen in FIGS. 2 and 3, the housing 120, as seen in plan view, is at least more or less in the form of a circle segment. The size of the circle segment here corresponds more or less to twice the pivoting angle α over which the locking lever 100 passes as it pivots.

In summary, the construction of the belt-guiding element 60 allows a maximum size for the opening 600 (see opening distance D in FIG. 3) and thus particularly easy access to the accommodating slot 130, the belt-guiding element at the same time being very compact, so that the safety belt 40 can easily be introduced and removed.

The geometrical configuration of the housing 120, in particular the rounded sliding surface 610 of the housing 120, and the arrangement and the opening direction of the pivotable locking lever 100—the pivotable locking lever 100 is pivoted inward (into the belt-guiding element) for opening purposes—result in the situation where the safety belt 40, when being fastened, slides over the sliding surface 610, virtually of its own accord, through the opening 600, into the accommodating slot 130 and thus into the belt-guiding element 60. In this case, the edge of the safety belt 40 opens the pivotable locking lever 100. It is not necessary for the belt-guiding element 60 or the locking lever 100 to be gripped and actuated directly. The belt-guiding element 60 according to an embodiment shown in to FIGS. 1 to 3 thus results in (virtually) automatic belt positioning.

Moreover, and this is a further possible advantage of the belt-guiding element 60 according to an embodiment shown in FIGS. 1 to 3, the opening 600 of the accommodating slot 130 is oriented upward, so that the belt forces which occur in the event of a crash cannot subject the closure to loading. The accommodating slot 130 is thus preferably located—after installation on the vehicle seat—in the plane which is defined by the longitudinal direction of the vehicle and the transverse direction of the vehicle (x- and y-directions of the vehicle).

In an embodiment, the region which is subjected to pronounced loading in the event of a crash, moreover, is formed in a hook-like manner (see hook region 620) such that the belt can be—that is to say even in the event of an accident—held in position. The hook region 620 is preferably arranged laterally or transversely in relation to the direction of travel.

FIGS. 4 and 5 illustrate a further exemplary embodiment of the belt-guiding element 60 according to FIG. 1. This second exemplary embodiment differs from the first exemplary embodiment in the configuration of the sliding surface 610: in the case of the second exemplary embodiment according to FIGS. 4 and 5, the sliding surface 610 is completely rounded in the front region 630 and—as seen from the sides—preferably has an oval or elliptically shaped tip 640.

Germany Priority Application DE 10 2004 048 997.1 filed Oct. 5, 2004, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A belt-guiding element for a child-safety system, comprising:
   an accommodating slot for accommodating a vehicle-mounted safety belt; and
   a locking element with an open position and a closed position, the locking element comprising a pivotable locking lever which can be pivoted about a pivot pin spaced apart from the accommodating slot,
   wherein the safety belt can be inserted into the accommodating slot or an inserted safety belt can be removed from the accommodating slot when the locking element is in the open position,
   wherein the safety belt is prevented from being inserted or removed when the locking element is in the closed position, and
   wherein at least a portion of the accommodating slot runs in a circular path along a circumference of a virtual circle, and the pivot pin of the locking lever forms a center point of the virtual circle.

2. The belt-guiding element as claimed in claim 1, wherein, during open or closed positioning of the locking lever, an end of the locking lever which is directed toward the accommodating slot forms a section of a locking-lever circular path with at least a portion running concentrically in relation to the accommodating slot.

3. The belt-guiding element as claimed in claim 1, wherein, connected to an end of the locking lever which is directed toward the accommodating slot is a positioning member, of which the outer contour corresponds to a section of the circular path over which the locking lever passes as it pivots, and which, in the closed end position of the locking lever, restrains the safety belt in the accommodating slot.

4. The belt-guiding element as claimed in claim 3, further comprising a housing, the housing of the belt-guiding element includes a positioning member accommodating opening for accommodating the positioning member, and at least a portion of the positioning member is inserted into the positioning member accommodating opening in the open position of the locking lever.

5. The belt-guiding element as claimed in claim 1, further comprising a covering element arranged on the locking lever to prevent parts of a body from being inserted between the locking lever and a housing that retains the pivot pin of the locking lever.

6. The belt-guiding element as claimed in claim 5, wherein the housing includes a covering element accommodating opening for accommodating the covering element, and at least a portion of the covering element, in the open position of the locking lever, is inserted into the covering element accommodating opening.

7. The belt-guiding element as claimed in claim 1, further comprising a positioning member and a covering element that are integrally connected to the locking lever.

8. The belt-guiding element as claimed in claim 1, further comprising a positioning member and a covering element that are separated from one another by a separating slot.

9. The belt-guiding element as claimed in claim 8, wherein the separating slot is dimensioned so as to prevent parts of a body from being inserted into the separating slot.

10. The belt-guiding element as claimed in claim 1, wherein the locking lever is arranged such that, in the open state, the locking lever releases at least a fifth of the accommodating slot.

11. The belt-guiding element as claimed in claim 1, wherein an end of the locking lever is provided with a latching element which interacts with a latching device of a housing that retains the pivot pin, the latching device being configured such that the latching device latches the locking lever in a closed end position and releases the locking lever only when a predetermined minimum deflecting force has been exceeded.

12. The belt-guiding element as claimed in claim 1, further comprising a housing of the belt-guiding element, the housing, as seen in plan view, is in the form of a circle segment, and a segment-angle size of the circle segment corresponds at least to twice the pivoting angle of the locking lever.

13. The belt-guiding element as claimed in claim 1, further comprising a housing that includes a rounded sliding surface.

14. The belt-guiding element as claimed in claim 1, wherein an opening of the accommodating slot is oriented upward.

15. The belt-guiding element as claimed in claim 1, further comprising a housing that includes a hook region.

16. The belt-guiding element as claimed in claim 15, wherein the hook region is formed in a hook-like manner such that the safety belt is held in position even in an event of an accident.

17. A belt-guiding element for a child-safety system, comprising:
   an accommodating slot for accommodating a vehicle-mounted safety belt; and
   a locking element with an open position and a closed position, the locking element comprising a pivotable locking lever which can be pivoted about a pivot pin spaced apart from the accommodating slot,
   wherein the safety belt can be inserted into the accommodating slot or an inserted safety belt can be removed from the accommodating slot when the locking element is in the open position,
   wherein the safety belt is prevented from being inserted or removed when the locking element is in the closed position, and
   wherein at least a portion of the accommodating slot runs in the form of a circular path, and the pivot pin of the locking lever forms a center point of the circular path of the accommodating slot,
   wherein, in at least one pivoting position, the locking lever is positioned perpendicularly in relation to an imaginary tangent which is formed over a course of the accommodating slot, at that location of the accommodating slot which is located closest to the end of the locking lever.

18. A belt-guiding element for a child-safety system, comprising:
- an accommodating slot for accommodating a vehicle-mounted safety belt; and
- a locking element with an open position and a closed position, the locking element comprising a pivotable locking lever which can be pivoted about a pivot pin spaced apart from the accommodating slot,
- wherein the safety belt can be inserted into the accommodating slot or an inserted safety belt can be removed from the accommodating slot when the locking element is in the open position,
- wherein the safety belt is prevented from being inserted or removed when the locking element is in the closed position, and
- wherein at least a portion of the accommodating slot runs in the form of a circular path, and the pivot pin of the locking lever forms a center point of the circular path of the accommodating slot,
- wherein the locking lever is pivoted inward to an open position.

19. A child seat, comprising:
a belt-guiding element, the belt guiding element includes:
- an accommodating slot for accommodating a vehicle-mounted safety belt; and
- a locking element with an open position and a closed position, the locking element comprising a pivotable locking lever which can be pivoted about a pivot pin spaced apart from the accommodating slot,
- wherein the safety belt can be inserted into the accommodating slot or an inserted safety belt can be removed from the accommodating slot when the locking element is in the open position,
- wherein the safety belt is prevented from being inserted or removed when the locking element is in the closed position, and
- wherein at least a portion of the accommodating slot runs in a circular path along a circumference of a virtual circle, and the pivot pin of the locking lever forms a center point of the virtual circle.

20. The child seat as claimed in claim 19, wherein the belt-guiding element is fastened on the child seat.

21. The child seat as claimed in claim 20, wherein the belt-guiding element is arranged at a shoulder height of a child who is to be secured in the child seat.

22. The child seat as claimed in claim 19, wherein a position of the belt-guiding element on the child seat is height-adjustable.

23. The child seat as claimed in claim 19, wherein the belt-guiding element is fastened on the child seat such that the opening of the accommodating slot of the belt-guiding element is oriented upward.

24. The child seat as claimed in claim 19, further comprising a housing including a hook region arranged laterally or transversely in relation to a direction of travel.

* * * * *